United States Patent
Wang et al.

(10) Patent No.: US 12,164,577 B2
(45) Date of Patent: *Dec. 10, 2024

(54) SYSTEMS AND METHODS FOR DETERMINING DESCRIPTORS FOR MEDIA CONTENT ITEMS

(71) Applicant: Spotify AB, Stockholm (SE)

(72) Inventors: Alice Yiqing Wang, New York, NY (US); Ian James Anderson, New York, NY (US); Philip Hunter McCurry, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,226

(22) Filed: Dec. 14, 2022

(65) Prior Publication Data
US 2023/0110071 A1   Apr. 13, 2023

Related U.S. Application Data

(63) Continuation of application No. 16/732,176, filed on Dec. 31, 2019, now Pat. No. 11,556,596.

(51) Int. Cl.
*G06F 16/908* (2019.01)
*G06F 16/68* (2019.01)
(Continued)

(52) U.S. Cl.
CPC .......... *G06F 16/908* (2019.01); *G06F 16/686* (2019.01); *G06F 16/90348* (2019.01); *G06F 16/9535* (2019.01)

(58) Field of Classification Search
CPC ....... G06F 16/14–156; G06F 16/24573; G06F 16/38–382; G06F 16/48; G06F 16/58;
(Continued)

(56) References Cited

U.S. PATENT DOCUMENTS 7,685,132 B2    3/2010 Hyman
8,583,671 B2   11/2013 Martin et al.
(Continued)

FOREIGN PATENT DOCUMENTS

EP        3340073 A1    6/2018
WO    WO 2017/015218 A1    1/2017

OTHER PUBLICATIONS

Klamra, Notice of Allowance, U.S. Appl. No. 16/825,074, filed Nov. 16, 2021, 8 pgs.
(Continued)

*Primary Examiner* — Robert W Beausoliel, Jr.
*Assistant Examiner* — Nirav K Khakhar
(74) *Attorney, Agent, or Firm* — Morgan, Lewis & Bockius LLP

(57) ABSTRACT

An electronic device obtains a plurality of collections of media content items, each collection of media content items being associated with text generated by one or more users of the media-providing service. Based on how frequently a first media content item co-occurs with a first descriptor in text for respective collections of media items that include the first media content item, the electronic device generates, without user input, a new collection of media content items for a first user. The new collection of media content items corresponds to the first descriptor and includes the first media content item. The electronic device presents the new collection of media content items to the first user as a recommendation.

20 Claims, 7 Drawing Sheets

(51) Int. Cl.
*G06F 16/903* (2019.01)
*G06F 16/9535* (2019.01)

(58) Field of Classification Search
CPC ........ G06F 16/68; G06F 16/78; G06F 16/907; G06F 16/908; G06F 16/9535; G06F 16/90348
See application file for complete search history.

(56) References Cited

U.S. PATENT DOCUMENTS

| | | |
|---|---|---|
| 9,524,084 B2 | 12/2016 | Otto et al. |
| 9,942,356 B1 | 4/2018 | Gibson et al. |
| 10,013,492 B1 | 7/2018 | Petts et al. |
| 10,055,413 B2 | 8/2018 | Jehan et al. |
| 10,140,515 B1 | 11/2018 | Waldo |
| 10,375,454 B1 | 8/2019 | Parker |
| 2005/0015712 A1 | 1/2005 | Plastina et al. |
| 2006/0167876 A1 | 7/2006 | Benitez et al. |
| 2009/0055376 A1 | 2/2009 | Slaney et al. |
| 2009/0070184 A1 | 3/2009 | Svendsen |
| 2009/0076821 A1 | 3/2009 | Brenner et al. |
| 2009/0132905 A1 | 5/2009 | Hoshino |
| 2009/0304272 A1 | 12/2009 | Makadia et al. |
| 2009/0327222 A1 | 12/2009 | Spitzer-Williams et al. |
| 2010/0125351 A1 | 5/2010 | Davydov |
| 2010/0161619 A1 | 6/2010 | Lamere et al. |
| 2010/0223223 A1 | 9/2010 | Sandler et al. |
| 2011/0099514 A1 | 4/2011 | Singhal et al. |
| 2013/0254065 A1 | 9/2013 | Harbick et al. |
| 2014/0289241 A1 | 9/2014 | Anderson |
| 2016/0063116 A1 | 3/2016 | Abuelsaad et al. |
| 2016/0210345 A1 | 7/2016 | Spiegelman et al. |
| 2017/0155964 A1 | 6/2017 | Oztaskent et al. |
| 2018/0189306 A1 | 7/2018 | Lamere et al. |
| 2018/0365239 A1 | 12/2018 | Bharati et al. |
| 2019/0042576 A1 | 2/2019 | Mpossi et al. |
| 2019/0294690 A1 | 9/2019 | Pastor et al. |
| 2021/0200805 A1 | 7/2021 | Wang et al. |

OTHER PUBLICATIONS

Levy et al., Improving Distributional Similarity with Lessons Learned from Word Embeddings, May 2015, Transactions of the Association for Computational Linguistics, vol. 3, pp. 211-225, 16 pgs.

Klamra, Office Action, U.S. Appl. No. 17/677,779, filed Nov. 15, 2022, 9 pgs.

Klamra, Notice of Allowance, U.S. Appl. No. 17/677,779, filed Dec. 29, 2022, 7 pgs.

Wang, Office Action, U.S. Appl. No. 16/732,176, filed Oct. 4, 2021, 15 pgs.

Wang, Office Action, U.S. Appl. No. 16/732,176, filed Apr. 12, 2022, 16 pgs.

Wang, Notice of Allowance, U.S. Appl. No. 16/732,176, filed Aug. 30, 2022, 7 pgs.

Wang, Office Action, U.S. Appl. No. 18/190,779, filed Nov. 28, 2023, 8 pgs.

Wang, Notice of Allowance, U.S. Appl. No. 18/190,779, filed Mar. 13, 2024, 10 pgs.

SYSTEMS AND METHODS FOR DETERMINING DESCRIPTORS FOR MEDIA CONTENT ITEMS

RELATED APPLICATIONS

This application is a continuation of U.S. patent application Ser. No. 16/732,176, filed Dec. 31, 2019, which is incorporated by reference herein in its entirety.

TECHNICAL FIELD

The disclosed embodiments relate generally to determining descriptors for media content items, and, in particular, to determining a coincidence metric for descriptors and media content items and providing content to a user based on the coincidence metric.

BACKGROUND

Access to electronic media, such as music and video content, has expanded dramatically over time. As a departure from physical media, media content providers stream media to electronic devices across wireless networks, improving the convenience with which users can digest and experience such content.

As it becomes easier for users to find content, media content providers can organize media content items and group related content items together in order to provide users with better recommendations. Media content providers use a combination of information about the media content items and information about the users in order to provide personalized content for users.

SUMMARY

There is a need for systems and methods of associating descriptor terms with media content items. These descriptor terms may change over time to reflect current events and movements that are relevant to a user. For example, over time, the way users describe media content items may evolve to include different terms and phrases, e.g., by referring to emerging political and cultural events. To that end, some embodiments of the present disclosure provide systems and methods for determining which descriptor are being used to reference media content items and creating descriptor terms for media items that reflect user preferences. The media content provider is then able to group media content items based on the descriptors that are associated with each media content item (e.g., to provide culturally and/or politically-relevant playlists).

For example, media content items are associated with one or more descriptor terms based on how users categorize the media content items (e.g., using descriptive text provided by users). To that end, a system crowdsources data from a plurality of users of a media-providing service. The data includes text describing media content items, such as a user-input playlist title and/or a title of the media content item. The system uses the data to determine how frequently a respective media content item co-occurs with various descriptors found in the text. For example, the system creates a coincidence matrix to represent how closely and uniquely related a media content item is to a given descriptor (e.g., by calculating pointwise mutual information (PMI)). Based on the coincidence matrix, the system generates a list of media content items (e.g., a playlist) that includes media content items that are associated with a respective descriptor. In some embodiments, only media content items that are in the user's playback history are included in the playlist.

In accordance with some embodiments, a method is performed at a first electronic device. The first electronic device has one or more processors and memory storing instructions for execution by the one or more processors. The method includes obtaining a plurality of collections of media content items, each collection of media content items being associated with text generated by one or more users of the media-providing service. The method includes determining a coincidence metric for a first descriptor and a first media content item, the coincidence metric corresponding to a likelihood that the first descriptor appears in the text associated with a respective collection of media content items that includes the first media content item. The method further includes, based on the coincidence metric, generating a new collection of media content items for a first user. The new collection of media items corresponds to the first descriptor and includes the first media content item.

In some embodiments, the new collection of media content items is generated based on a playback history of media content items that have been previously consumed by the first user.

In some embodiments, the method further includes generating a second new collection of media content items for the first user in accordance with a determination that a playback history of the first user is updated.

In some embodiments, the coincidence metric is a pointwise mutual information (PMI) metric.

In some embodiments, the media content items in the new collection of media content items are ranked, in an ordered list, according to the coincidence metric.

In some embodiments, the new collection of media content items is generated in response to receiving a user input indicative of the first descriptor.

In some embodiments, the user input comprises text.

In some embodiments, the new collection of media content items is generated automatically without user input, and the new collection of media content items is presented to the first user as a recommendation.

In some embodiments, the method further includes, for a respective media content item from the plurality of collections of media content items, determining a list of one or more relevant descriptors and displaying at least one of the one or more relevant descriptors to the first user in association with the respective media content item.

In some embodiments, the one or more relevant descriptors describe culturally- and/or politically-relevant terms.

In some embodiments, the one or more relevant descriptors comprise n-grams.

In some embodiments, the coincidence metric is normalized to account for descriptors and/or media content items that do not satisfy a threshold.

In some embodiments, the coincidence metric has a positive or a negative value.

In some embodiments, the text associated with a respective collection of media content items is a title of the respective collection of media content items and/or text of metadata associated with the respective collection of media content items.

In accordance with some embodiments, a first electronic device includes one or more processors and memory storing one or more programs configured to be executed by the one or more processors. The one or more programs include instructions for obtaining a plurality of collections of media content items, each collection of media content items being associated with text generated by one or more users of the media-providing service. The one or more programs further include instructions for determining a coincidence metric for a first descriptor and a first media content item, the coincidence metric corresponding to a likelihood that the first descriptor appears in the text associated with a respective collection of media content items that includes the first media content item. The one or more programs further include instructions for, based on the coincidence metric, generating a new collection of media content items for a first user. The new collection of media content items corresponds to the first descriptor and includes the first media content item.

In accordance with some embodiments, a computer-readable storage medium has stored therein instructions that, when executed by an electronic device, cause the first electronic device to obtain a plurality of collections of media content items, each collection of media content items being associated with text generated by one or more users of the media-providing service. The instructions further cause the device to determine a coincidence metric for a first descriptor and a first media content item, the coincidence metric corresponding to a likelihood that the first descriptor appears in the text associated with a respective collection of media content items that includes the first media content item. The instructions further cause the device to, based on the coincidence metric, generate a new collection of media content items for a first user. The new collection of media content items corresponds to the first descriptor and includes the first media content item.

Thus, systems are provided with improved methods for determining how various descriptor terms relate to media content items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
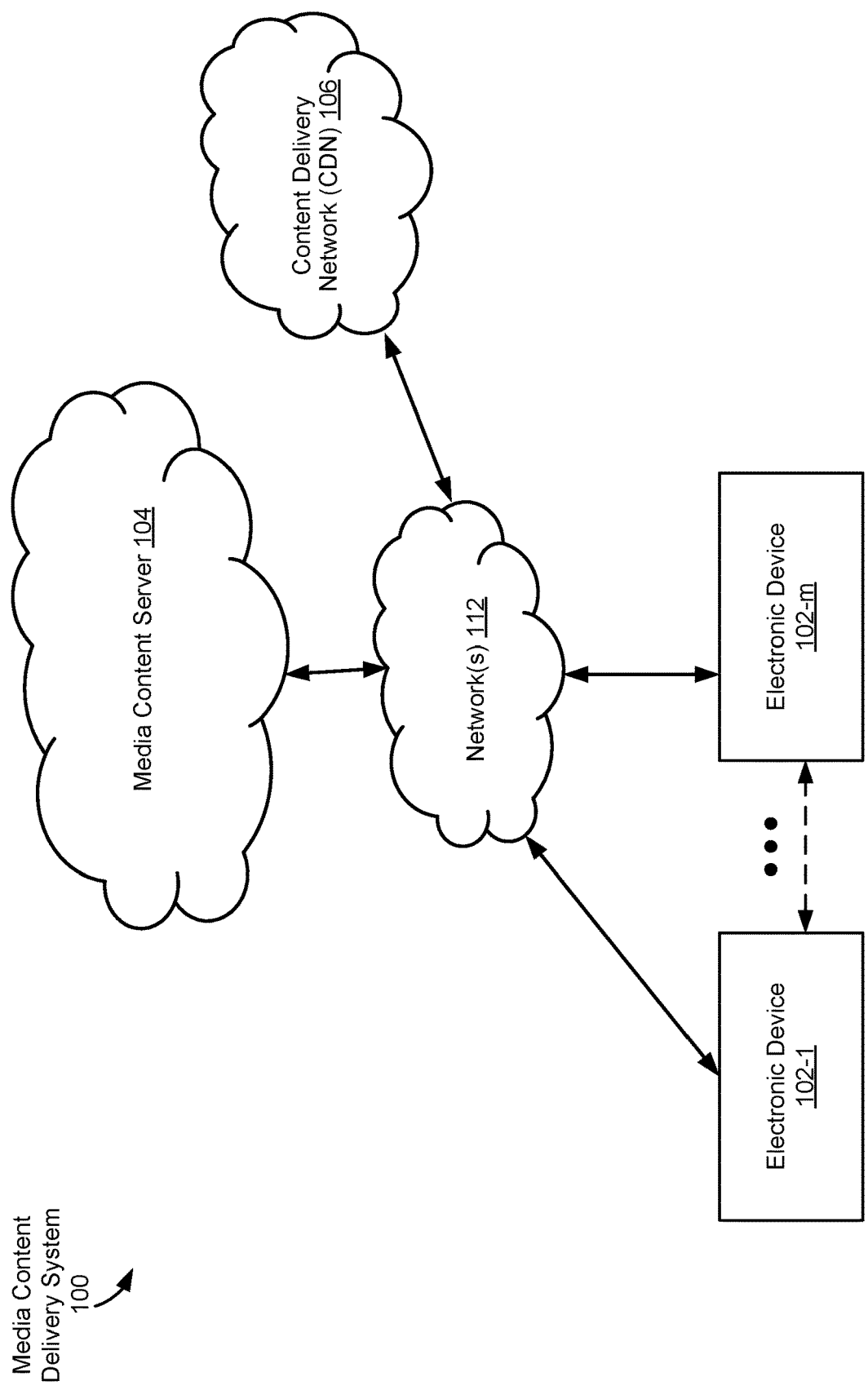
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
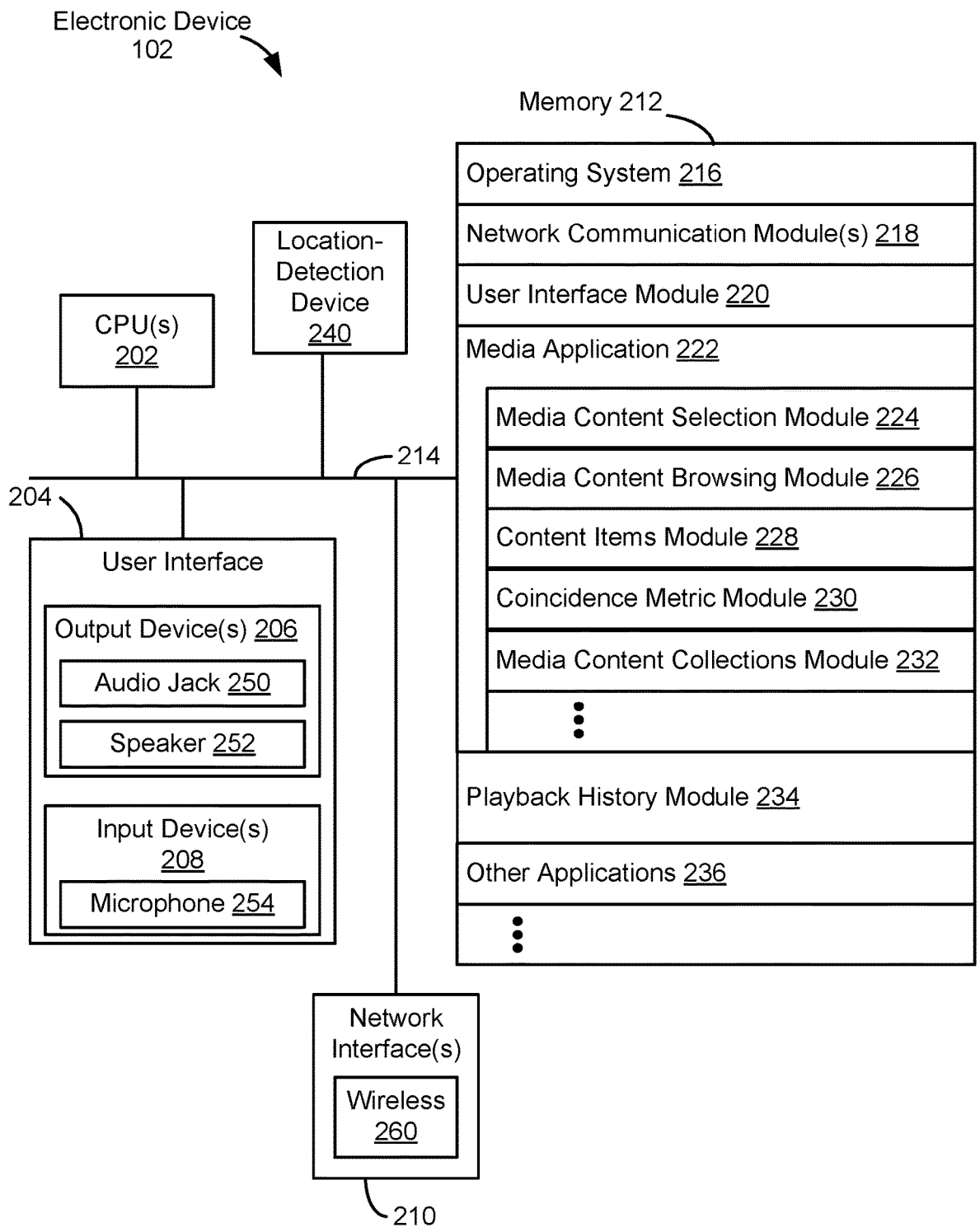
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
- media content selection module 224 for selecting one or more media content items and/or sending, to the media content server, an indication of the selected media content item(s);
- a media content browsing module 226 for providing controls and/or user interfaces enabling a user to navigate, select for playback, and otherwise control or interact with media content, whether the media content is stored or played locally or remotely;
- a content items module 228 for storing media items for playback at the electronic device;
- coincidence metric module 230 for determining (e.g., calculating) and storing coincidence metrics that represent correlation between a media content item (e.g., stored in content items module 228) and one or more descriptor terms (e.g., stored in descriptors module 320); and
- media content collections module 232 for storing and/or creating (e.g., curating) media content collections, each media content collection associated with one or more descriptor terms (e.g., playlist titles and/or descriptions) and/or including one or more media content items (e.g., media content items that are storied in content items module 228).
- a playback history module 234 for storing (e.g., as a list for each user) media content items that have been presented (e.g., streamed) to a respective user and/or analyzing playback patterns for one or more users; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
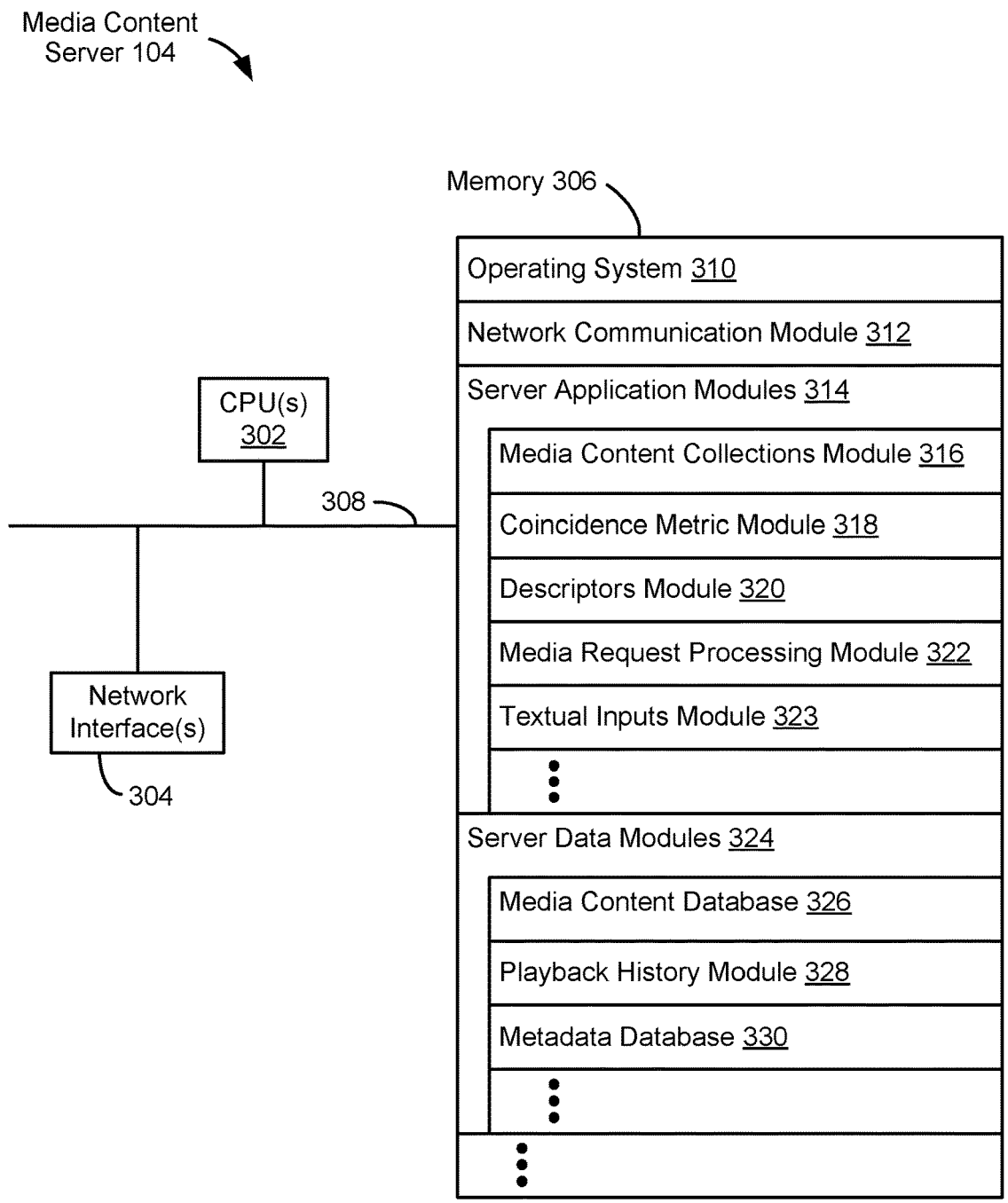
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s)

within memory 306, includes a non-transitory computer-readable storage medium. In some embodiments, memory 306, or the non-transitory computer-readable storage medium of memory 306, stores the following programs, modules and data structures, or a subset or superset thereof:
- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content collections module 316 for storing and/or creating (e.g., curating) media content collections, each media content collection associated with one or more descriptor terms (e.g., playlist titles and/or descriptions) and/or including one or more media content items;
  - a coincidence metric module 318 for determining (e.g., calculating) and storing coincidence metrics that represent correlation between a media content item (e.g., stored in content items module 228) and one or more descriptor terms (e.g., stored in descriptors module 320);
  - a descriptors module 320 for determining and/or storing descriptor terms (e.g., politically- and/or socially-relevant terms) to be used in the coincidence metric;
  - a media request processing module 322 for processing requests for media content and facilitating access to requested media items by electronic devices (e.g., the electronic device 102) including, optionally, streaming media content to such devices;
  - a textual inputs module 323 for storing and/or analyzing textual inputs (e.g., from users) to determine descriptor terms (e.g., to be stored in descriptors module 320).
- one or more server data module(s) 324 for handling the storage of and/or access to media items and/or metadata relating to the media items; in some embodiments, the one or more server data module(s) 324 include:
  - a media content database 326 for storing media items;
  - a playback history module 328 for storing (e.g., as a list for each user) media content items that have been presented (e.g., streamed) to a respective user and/or analyzing playback patterns for one or more users; and a metadata database 330 for storing metadata relating to the media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 326 and/or metadata database 330 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
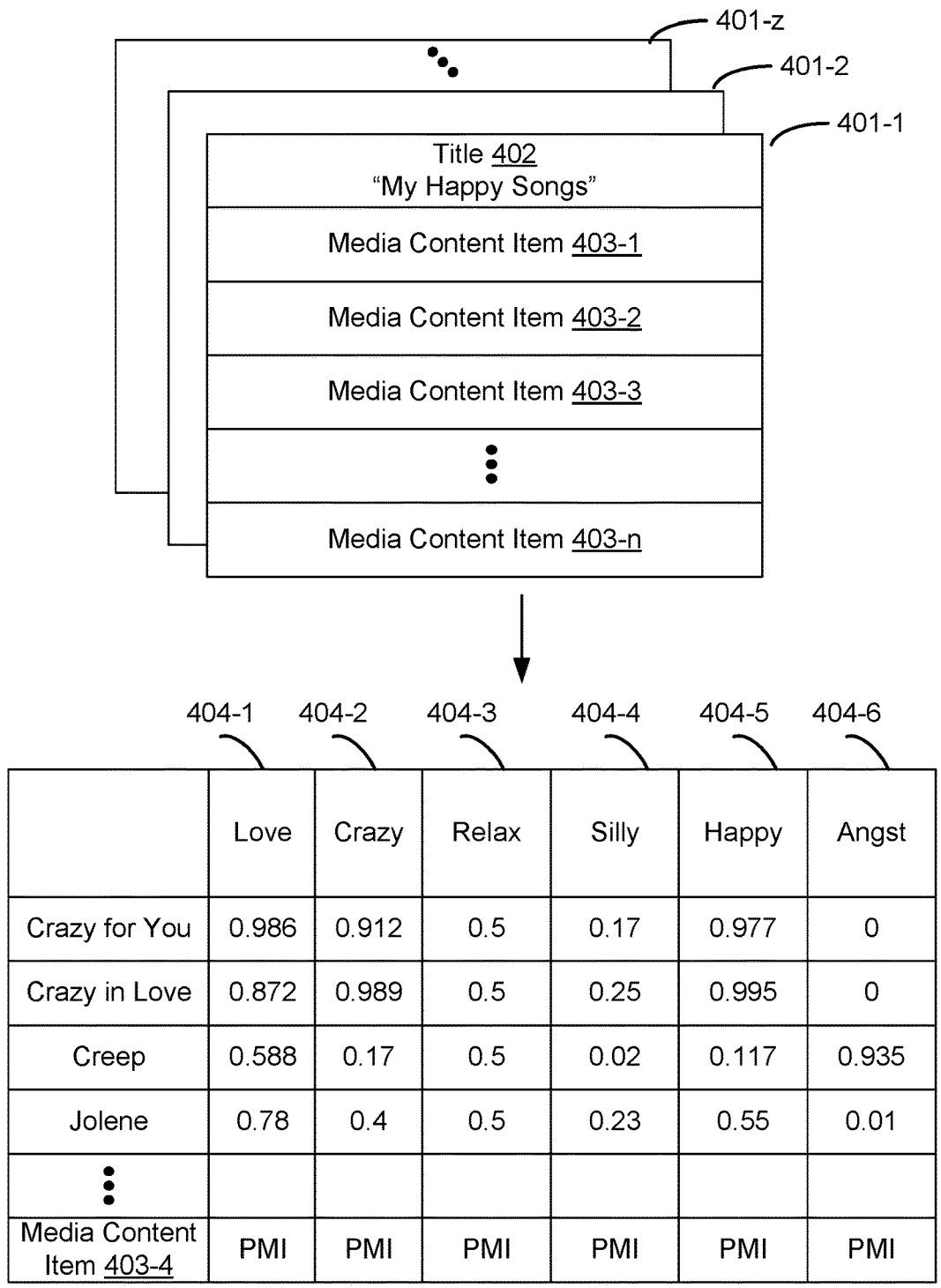
FIG. 4 is a block diagram illustrating generating a coincidence metric from collections of media content items, in accordance with some embodiments.

FIG. 4 illustrates determining a coincidence metric for media content items in a collection of media content items. A plurality of collections of media content items 401 (e.g., a collection of media content items 401-1, a collection of media content items 401-2, and collection of media content items 401-z, where z is an integer greater than 1) is stored by a media providing service (e.g., in media content item collections module 316).

In some embodiments, each collection of media content items 401 is associated with text generated by one or more users of the media-providing service. For example, collection of media content items 401-1, includes a title 402, "My Happy Songs." In some embodiments, the title 402 is input (e.g., typed) by a user, and thus the title comprises user-generated text. For example, when a user creates a playlist, the user inputs a title of the playlist. For example, the user types "My Happy Songs" as the title of the user's collection of media content items 401. In some embodiments, title 402 is generated by the media-providing service.

In some embodiments, the collection of media content items 401 comprises a playlist. In some embodiments, the collection of media content items 401 includes one or more media content items 403 (e.g., media content items 403-1, 403-2, 403-3 through 403-n, where n is an integer greater than 3). In some embodiments, the collection of media content items 401 includes a plurality of media content items.

In some embodiments, the collection of media content items 401 is generated by a user. For example, the user selects media content items 403 to add to a playlist (e.g., the collection of media content items 401). In some embodiments, the collection of media content items 401 is generated automatically (e.g., without user input). For example, the collection of media content items 401 corresponds to a radio station streaming media content items, a channel for streaming podcast episodes, and/or a playlist generated automatically (e.g., by the media providing service). In some embodiments, the text associated with the collection of media content items 401 comprises user-provided descriptions of playlists generated by the media providing service (e.g., "Perfect cookout playlist!").

In some embodiments, one or more descriptor terms (e.g., predefined descriptor terms) are identified in title 402. For example, "My Happy Songs" includes the descriptor term "happy." In some embodiments, the one or more descriptor terms are defined by the media providing service. For example, the media providing service stores (e.g., in a database and/or Descriptors Module 320) a list of descriptor terms. In some embodiments, the descriptor terms words or a strings of words (e.g., n-grams) that the media providing service determines relate to the media content items. In some embodiments, a list of descriptor terms is determined from user-supplied search terms. For example, when a certain (e.g., threshold) number of users search (e.g., using a search feature provided by the media providing service) for the term "Election Day," the term "Election Day" is automatically-added to the list of descriptor terms. In some circumstances, the descriptor terms may relate to emotions (e.g., happy, sad, angst, etc.). In some circumstances, the descriptor terms may relate to events (e.g., Women's March) and/or to culturally- or politically-relevant movements (e.g., Election Day). In some embodiments, the descriptor terms are identified using crowdsourcing. For example, the media providing service identifies when a plurality of users have input the same and/or similar text (e.g., when the users perform a search and/or how the users title playlists), and in response to determining that the number of users that have used the term satisfies a threshold, the media providing service creates a descriptor term.

In some embodiments, for each of the media content items, a coincidence metric is calculated. The coincidence metric represents how closely related the media content item is to a descriptor term. For example, the table shown in FIG. 4 illustrates a plurality of media content items, such as "Crazy for You," "Crazy in Love," "Creep," "Jolene," and media content item 403-4. For each media content item, a coincidence metric (e.g., a pairwise coincidence metric) is calculated between the media content item and the descriptor 404, such as "love" 404-1, "crazy" 404-2, "relax" 404-3, "silly" 404-4, "happy" 404-5, and "angst" 404-6.

In some embodiments, the coincidence metric comprises a pointwise mutual index (PMI). For example, the PMI is calculated as:

$$PMI_\alpha(t, d) = \log\left(\frac{\hat{P}(t, d)}{\hat{P}(t)\hat{P}_\alpha(d)}\right) \quad (1)$$

where t represents the media content item (e.g., a track), d represents a descriptor, and $\hat{P}$ (t,d) represents the likelihood (e.g., across the plurality of collections of media items) that the descriptor d appears in text associated with a respective collection of media content items that includes the media content item t. $\hat{P}$(t) represents the likelihood that a track appears in a collection of media content items (e.g., of a plurality of collections of media content items) and $\hat{P}_\alpha$(d) represents the likelihood that a descriptor appears in text that is associated with a collection of media content items (e.g., of the plurality of collections of media content items), normalized by a, as described below in Equation 2.

Consider an example in which the media providing service stores 100 collections of media items (e.g., playlists); the term "Happy" appears in 15 of the playlist titles; the track "Crazy for you" appears in 30 of the playlists; and the term "Happy" appears in 12 of the 30 playlist titles of playlists that include the track "Crazy for you." In this example, $\hat{P}$(t,d)=12/30; $\hat{P}$(t)=30/100; and $\hat{P}_\alpha$(d) depends on the parameter a, as described below.

In some embodiments, the likelihood that a descriptor appears in text that is associated with a collection of media content items is normalized as:

$$\hat{P}_\alpha(d) = \frac{\#(d)^\alpha}{\sum_d \#(d)^\alpha} \quad (2)$$

where the numerator represents the number of collections of media content items (e.g., playlists) that are associated with text that includes the descriptor d and the denominator represents the sum of any descriptor appearing in any collection of media content items raised to a parameter a, which scales the PMI values such that infrequently occurring descriptors do not have skewed values (e.g., artificially high PMIs.) Stated another way, the parameter a reduces the bias (e.g., tendency) of the PMI calculation to yield very high values for infrequently occurring descriptors. In some embodiments, the parameter a is assigned (e.g., takes on) a value less than 1. In some embodiments, the parameter a is assigned (e.g., takes on) a value greater than 0. In some embodiments, after the PMI metrics are calculated according to Equation 1 above, the PMI metrics are scaled so that all coincidence values are between −1 and 1 (e.g., as shown in the matrix shown in FIG. 4). In some embodiments, alpha has a value less than 1 (e.g., and greater than zero).

In some embodiments, a larger coincidence metric (e.g., closer to the value of 1) indicates that the media content item and the descriptor are highly related. For example, "Crazy for You" has a coincidence metric of 0.986 with the descriptor "Love." This represents that the media content item "Crazy for You" is highly related to the descriptor of "Love."

The embodiments described above provide coincidence metrics that indicate when a respective media content item appears in a collection of media content items that is associated with the descriptor term. One of skill in the art, however, having the benefit of this disclosure, will understand that coincidence metrics may be determined (e.g., calculated) in an analogous manner using text (e.g., user generated or not) that is directly associated with an individual media playback item (e.g., descriptions of songs, song lyrics, etc.). In such embodiments, the coincidence metric accounts for when a respective media content item itself is associated with the descriptor term. For example, metadata is associated with each media content item. In some embodiments, the metadata includes a genre, artist, and/or any other "tags" that are stored in association with the media content item. In some embodiments, the descriptor term is based on the text of the metadata including the descriptor term.

In some embodiments, a user requests to generate a new collection of media items based on a descriptor term. For example, the user inputs the descriptor "Love" into a search feature of the media-providing service. In response to the user request, the media-providing service determines media content items that have a high coincidence metric (e.g., that satisfies a threshold, such as 0.8 and above) with the requested descriptor term (e.g., "Love"). The media-providing service provides a collection of media content items, where each media content item satisfies the threshold. For example, "Crazy for You" and "Crazy in Love" would be included in the result set (e.g., the collection of media content items), but "Creep" and "Jolene" would not be included (e.g., because these items have a coincidence metric with "Love" that does not satisfy the threshold).

In some embodiments, the system automatically (e.g., without user input) generates a new collection of media content items (e.g., a playlist) that includes media content items that are associated with a same descriptor term. In some embodiments, the system provides the new collection of media content items to the user. In some embodiments, the system provides the descriptor term, or other text that is related to the descriptor term, to the user (e.g., as a portion of a label of the new playlist). For example, the system generates a new collection of media content items that includes media content items that are associated with the descriptor "relax," and the system provides the user with a title "Relaxing Content" for the collection.

In some embodiments, the new collection of media content items is generated to only include media content items that have been previously consumed by the user (e.g., that are within the user's playback history). In some embodiments, the new collection of media content items is generated to include only media content items that have not been previously consumed by the user. In some embodiments, the new collection of media content items is generated to include a combination of media content items that have and have not been previously consumed by the user.

Figure 5A:
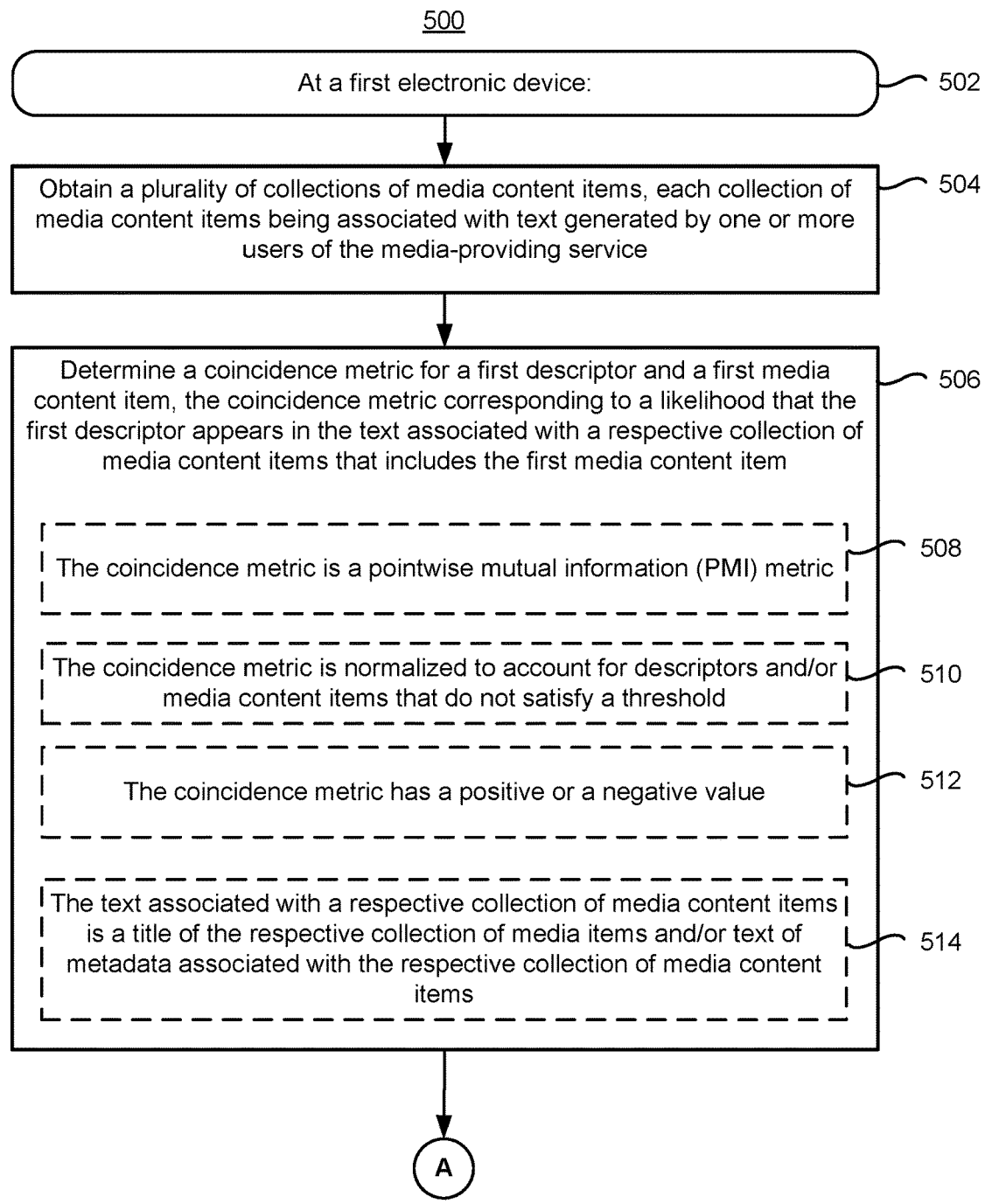
FIGS. 5A-5C are flow diagrams illustrating a method of generating a new collection of media content items, in accordance with some embodiments.
Figure 5B:
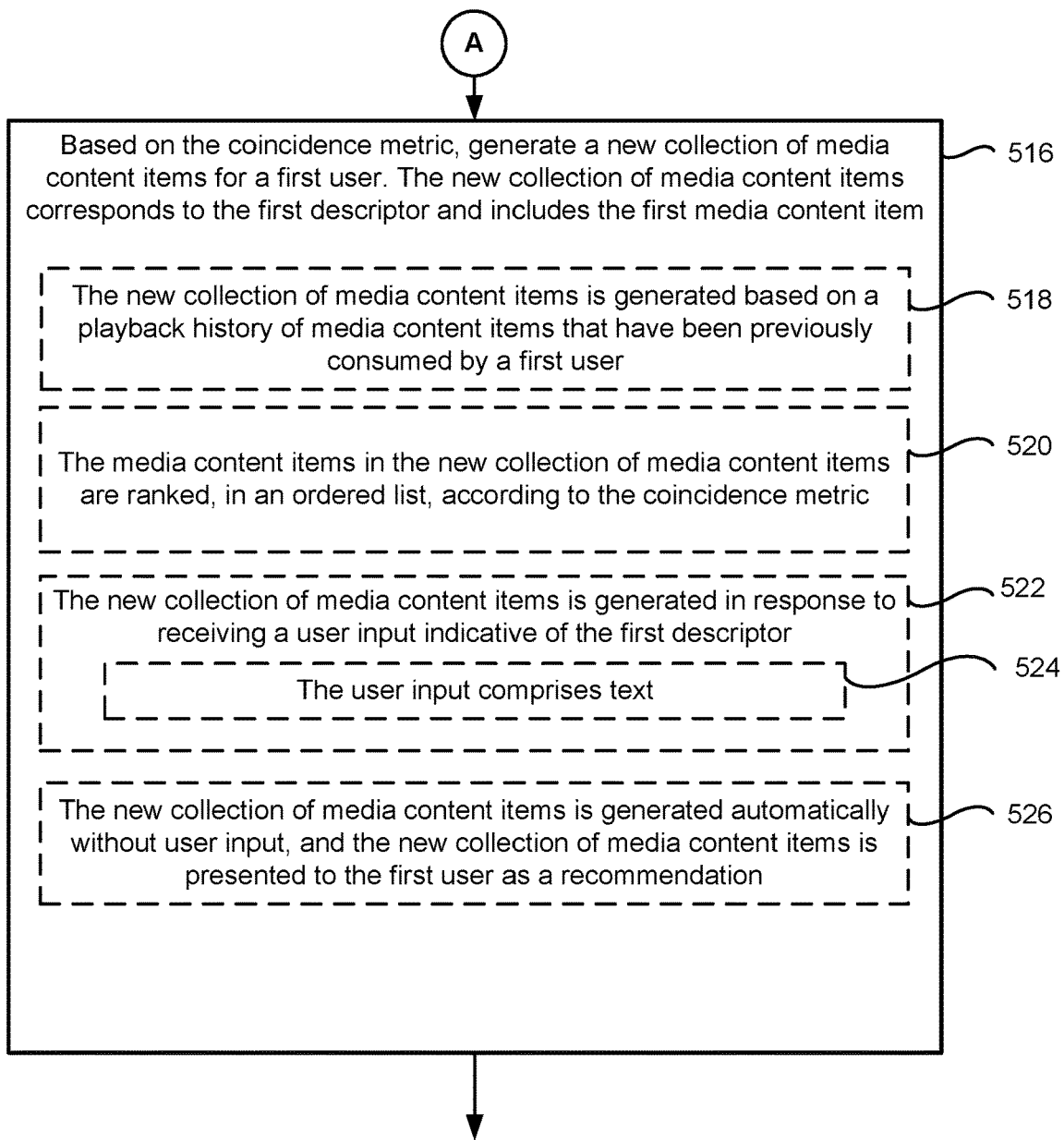
Figure 5C:
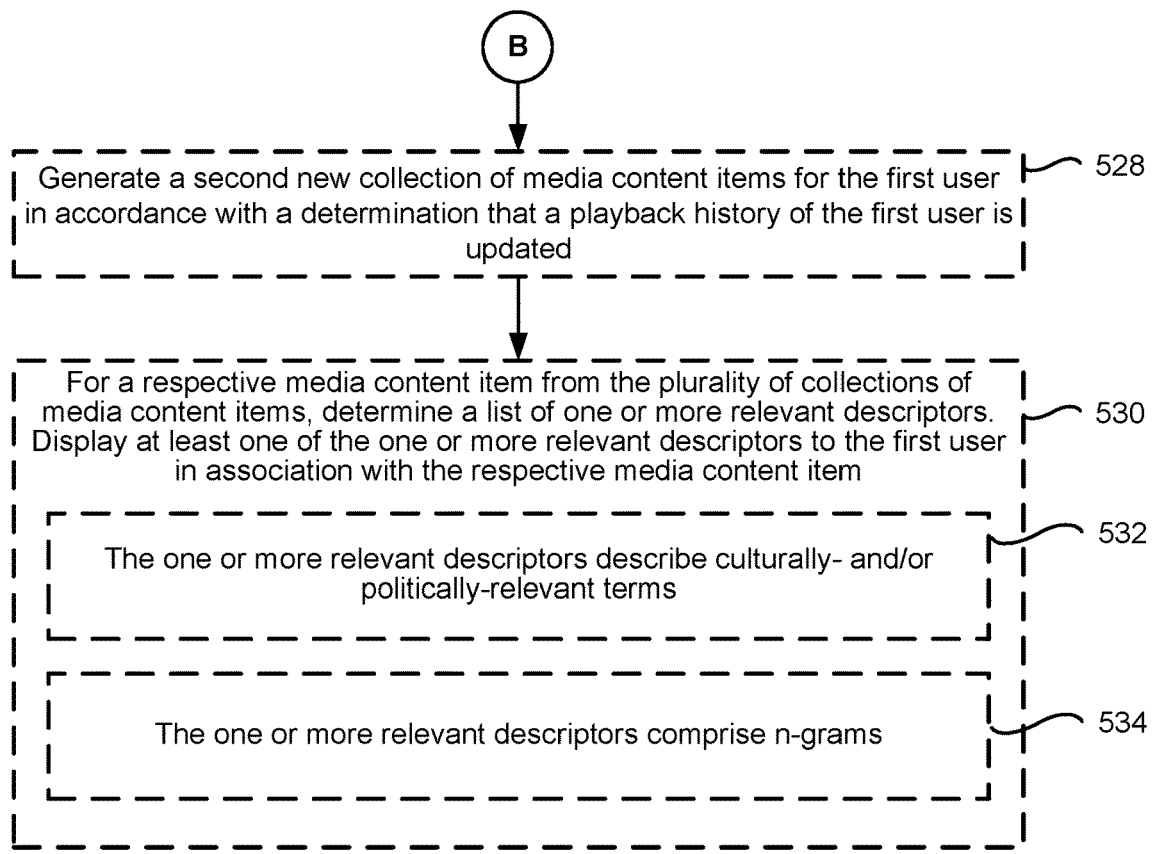

FIGS. 5A-5C are flow diagrams illustrating a method 500 for modifying a media content item, in accordance with some embodiments. Method 500 may be performed (502) at a first electronic device (e.g., media content server 104), the first electronic device having one or more processors and memory storing instructions for execution by the one or more processors. In some embodiments, the method 500 is performed by executing instructions stored in the memory (e.g., memory 212, FIG. 2) of the electronic device. In some embodiments, the method 500 is performed by an electronic device 102-1. In some embodiments, the method 500 is performed by a combination of the server system (e.g., including media content server 104 and/or CDN 106) and an electronic device (e.g., electronic device 102-1).

Referring now to FIG. 5A, in performing the method 500, the first electronic device obtains (504) a plurality of collections of media content items (e.g., stored in media content collections module 316). Each collection of media content items is associated with text generated by one or more users of the media-providing service. For example, each collection of media content items comprises a playlist and is associated with a name (e.g., title) of the playlist. In some embodiments, a user provides, as a text input, the name of the playlist. For example, a user generates a playlist and names the playlist on the user's device.

The electronic device determines (506) a coincidence metric for a first descriptor and a first media content item, the coincidence metric corresponding to a likelihood (e.g., frequency) that the first descriptor appears in the text associated with a respective collection of media content items that includes the first media content item. For example, the coincidence metric represents the likelihood (e.g., frequency) that the descriptor appears in the title (e.g., as input by the user) of the playlist.

In some embodiments, the coincidence metric is (508) a pointwise mutual information (PMI) metric. For example, FIG. 4 illustrates a PMI matrix that includes a PMI metric for each media content item compared with a plurality of descriptors. In some embodiments, the PMI is calculated by equation 1 as described above.

In some embodiments, the coincidence metric is normalized (510) to account for descriptors and/or media content items that do not satisfy a threshold. In some embodiments, the coincidence metric is normalized based on a frequency of the descriptors in the plurality of collections of media items and/or a frequency of the media items in the plurality of collections of media items (because PMI is biased towards infrequently occurring descriptors or tracks, PMI tends to create anomalously large values for pairing of infrequently-used descriptors and/or media items). For example, as explained with reference to Equation 2, the added parameter alpha normalizes the coincidence metric. In some embodiments, after normalization, the coincidence metric is scaled to a value between −1 and 1.

In some embodiments, the coincidence metric is (512) a positive or a negative value (e.g., is capable of taking on both positive and negative values). For example, using Equation 1, the coincidence metric is calculated using a log function, and therefore the metric can be positive or negative. In some embodiments, the more negative the value of the coincidence metric, the less related the media content item is to the descriptor term. For example, higher positive values of the metric indicate a correlation between the media content item and the descriptor term.

In some embodiments, the text associated with a respective collection of media content items is (514) a title of the respective collection of media items and/or text of metadata associated with the respective collection of media content items. For example, as described with reference to FIG. 4, the title of the collection of media items "My Happy Songs" is associated with the descriptor "happy." In some embodiments, the media content items that are included in the collection of media items with the title "My Happy Songs" are then associated with the descriptor happy.

The electronic device, based on the coincidence metric, generates (516) a new collection of media content items for a first user. For example, the new collection of media content items is an additional collection of media content items that is distinct from each collection of media content items in the plurality of collections of media content items. In some embodiments, the new collection of media content items corresponds to the first descriptor and includes the first media content item.

In some embodiments, the new collection of media content items is generated (518) based on (e.g., from) a playback history of media content items that have been previously consumed by the first user. For example, based on the playback history of the user (e.g., stored in playback history module 234 and/or 328), media content items that appear in the playback history of the first user are selected to be included in the new collection of media content items based on the coincidence metric.

In some embodiments, the media content items in the new collection of media content items are ranked (520), in an ordered list, according to the coincidence metric. For example, media content items that are more uniquely associated with the descriptor are ranked higher. In some embodiments, a media content item that is more uniquely associated with the descriptor has a greater (e.g., higher) coincidence metric (e.g., PMI metric) than the other media content items.

In some embodiments, the new collection of media content items is generated in response to receiving (522) a user input indicative of the first descriptor. For example, the first user enters the first descriptor in a search field of a graphical user interface, and in response to the search, a playlist (e.g., new collection) of media content items is generated for the first descriptor.

In some embodiments, the user input comprises (524) text (e.g., including voice-to-text). In some embodiments, the text from the user input is used as a descriptor. For example, after receiving the user input, the descriptors module stores the user input as an additional descriptor in the descriptors module.

In some embodiments, the new collection of media content items is generated (526) automatically without user input, and the new collection of media content items is presented to the first user as a recommendation (e.g., without the user entering a search into the search field). In some embodiments, the recommendation is presented to the user by the media application 222 (e.g., via user interface module 220). For example, the recommendation appears as a user interface element in the graphical user interface of the media application.

In some embodiments, the electronic device generates (528) a second new collection of media content items for the first user in accordance with a determination that a playback history of the first user is updated. For example, when the first user consumes (e.g., streams) additional media content items, the playback history of the first user is updated to include the additional media content items. After the playback history of the first user is updated, a second new collection of media content items (e.g., distinct from the first new collection of media content items) is generated. In some embodiments, the second new collection of media content items comprises the first new collection of media content items plus additional media content items (e.g., that have been added to the playback history of the first user).

In some embodiments, the electronic device, for a respective media content item from the plurality of collections of media content items, determines (530) a list of one or more relevant (e.g., top) descriptors (e.g., including the first descriptor). In some embodiments, the electronic device displays at least one of the one or more relevant descriptors to the first user in association with the respective media content item.

In some embodiments, the one or more relevant descriptors describe (532) culturally- and/or politically-relevant terms. For example, a descriptor refers to an event that is culturally relevant, such as "Women's March." As shown in FIG. 4, in some embodiments, the descriptor refers to an emotion, such as descriptors 404.

In some embodiments, the one or more relevant descriptors comprise (534) n-grams. For example, the descriptors may include multiple words, such as a phrase. In some embodiments, the one or more relevant descriptors are predefined (e.g., stored in descriptors module 320). For example, the descriptors are determined manually (e.g., by a curator) or automatically (e.g., based on search history patterns of users).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a first electronic device associated with a media-providing service, the first electronic device having one or more processors and memory storing instructions for execution by the one or more processors:
obtaining a plurality of collections of media content items, each collection of media content items being associated with text generated by one or more users of the media-providing service;
receiving, from a first user, in a search field of a graphical user interface of a media application associated with the media-providing service, a first descriptor;
generating, without user input, a new collection of media content items for the first user, wherein the new collection of media content items corresponds to the first descriptor, including:
selecting, for the new collection of media content items, a first media content item from a playback history of the first user, the first media content item selected based on how frequently a first media content item co-occurs with the first descriptor in text for respective collections of media items that include the first media content item;
displaying, in the graphical user interface of the media application associated with the media-providing service, one or more user interface elements representing the new collection of media items;
receiving a user input selecting a respective media content item from the new collection of media items; and
in response to the user input, streaming, to the media application associated with the media-providing service, the respective media content item from the new collection of media content items to the first user.

2. The method of claim 1, wherein the new collection of media content items is generated based on a playback history of media content items that have been previously consumed by the first user.

3. The method of claim 1, further comprising, generating a second new collection of media content items for the first user in accordance with a determination that a playback history of the first user is updated.

4. The method of claim 1, wherein the media content items in the new collection of media content items are ranked, in an ordered list, according to how frequently the first media content item co-occurs with the first descriptor in text for respective collections of media items that include the first media content item.

5. The method of claim 1, wherein the new collection of media content items is generated in response to receiving the first descriptor in the search field of the graphical user interface of the media application.

6. The method of claim 1, wherein receiving the first descriptor in the search field comprises receiving a text user input.

7. The method of claim 1, further comprising:
for a respective media content item from the plurality of collections of media content items, determining a list of one or more relevant descriptors; and
displaying at least one of the one or more relevant descriptors to the first user in association with the respective media content item.

8. The method of claim 7, wherein the one or more relevant descriptors describe culturally- and/or politically-relevant terms.

9. The method of claim 7, wherein the one or more relevant descriptors comprise n-grams.

10. The method of claim 1, wherein the text associated with a respective collection of media content items is a title of the respective collection of media content items and/or text of metadata associated with the respective collection of media content items.

11. A first electronic device associated with a media-providing service, comprising:
one or more processors; and
memory storing instructions for execution by the one or more processors, the instructions including instructions for:
obtaining a plurality of collections of media content items, each collection of media content items being associated with text generated by one or more users of the media-providing service;
receiving, from a first user, in a search field of a graphical user interface of a media application associated with the media-providing service, a first descriptor;
generating, without user input, a new collection of media content items for the first user, wherein the new collection of media content items corresponds to the first descriptor, including:
selecting, for the new collection of media content items, a first media content item from a playback history of the first user, the first media content item selected based on how frequently a first media content item co-occurs with the first descriptor in text for respective collections of media items that include the first media content item;
displaying, in the graphical user interface of the media application associated with the media-providing service, one or more user interface elements representing the new collection of media items;
receiving a user input selecting a respective media content item from the new collection of media items; and
in response to the user input, streaming, to the media application associated with the media-providing service, the respective media content item from the new collection of media content items to the first user.

12. The first electronic device of claim 11, wherein the new collection of media content items is generated based on a playback history of media content items that have been previously consumed by the first user.

13. The first electronic device of claim 11, wherein the instructions further include instructions for, generating a second new collection of media content items for the first user in accordance with a determination that a playback history of the first user is updated.

14. The first electronic device of claim 11, wherein the media content items in the new collection of media content items are ranked, in an ordered list, according to how frequently the first media content item co-occurs with the first descriptor in text for respective collections of media items that include the first media content item.

15. The first electronic device of claim 11, wherein the new collection of media content items is generated in response to receiving the first descriptor in the search field of the graphical user interface of the media application.

16. The first electronic device of claim 11, wherein receiving the first descriptor in the search field comprises receiving a text user input.

17. The first electronic device of claim 11, wherein the instructions further include instructions for:
for a respective media content item from the plurality of collections of media content items, determining a list of one or more relevant descriptors; and
displaying at least one of the one or more relevant descriptors to the first user in association with the respective media content item.

18. The first electronic device of claim 17, wherein the one or more relevant descriptors describe culturally- and/or politically-relevant terms.

19. The first electronic device of claim 17, wherein the one or more relevant descriptors comprise n-grams.

20. A non-transitory computer-readable storage medium storing instructions, which when executed by an electronic device associated with a media-providing service, cause the electronic device to perform a set of operations, comprising:
obtaining a plurality of collections of media content items, each collection of media content items being associated with text generated by one or more users of the media-providing service;
receiving, from a first user, in a search field of a graphical user interface of a media application associated with the media-providing service, a first descriptor;
generating, without user input, a new collection of media content items for the first user, wherein the new collection of media content items corresponds to the first descriptor, including:
selecting, for the new collection of media content items, a first media content item from a playback history of the first user, the first media content item selected based on how frequently a first media content item co-occurs with the first descriptor in text for respective collections of media items that include the first media content item;
displaying, in the graphical user interface of the media application associated with the media-providing service, one or more user interface elements representing the new collection of media items;
receiving a user input selecting a respective media content item from the new collection of media items; and
in response to the user input, streaming, to the media application associated with the media-providing service, the respective media content item from the new collection of media content items to the first user.

* * * * *